US011030188B2

(12) United States Patent
Lu et al.

(10) Patent No.: US 11,030,188 B2
(45) Date of Patent: Jun. 8, 2021

(54) PLATFORM FOR ATOMIC TRANSFER OF SMART ASSETS WITHIN BLOCKCHAIN NETWORKS

(71) Applicant: Advanced New Technologies Co., Ltd., George Town (KY)

(72) Inventors: Xuming Lu, Hangzhou (CN); Kailai Shao, Hangzhou (CN); Pengtao Qi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/390,119

(22) Filed: Apr. 22, 2019

(65) Prior Publication Data

US 2019/0251080 A1 Aug. 15, 2019

Related U.S. Application Data

(63) Continuation of application No. PCT/CN2018/118514, filed on Nov. 30, 2018.

(51) Int. Cl.
*G06F 16/23* (2019.01)
*G06F 21/64* (2013.01)
(Continued)

(52) U.S. Cl.
CPC .......... *G06F 16/2379* (2019.01); *G06F 7/14* (2013.01); *G06F 16/27* (2019.01); *G06F 21/64* (2013.01);
(Continued)

(58) Field of Classification Search
CPC ........ G06F 16/2379; G06F 16/27; G06F 7/14; G06F 21/64; G06Q 20/223; G06Q 30/06;
(Continued)

(56) References Cited

U.S. PATENT DOCUMENTS 9,043,278 B1 * 5/2015 Wilson ................... G06F 16/27
707/626
9,419,951 B1 8/2016 Felsher et al.
(Continued)

FOREIGN PATENT DOCUMENTS

CN 105956923 9/2016
CN 105976246 9/2016
(Continued)

OTHER PUBLICATIONS

Translation of Ding et al. "Block chain-based digital asset superposition method and device" CN105976246, Sep. 28, 2016, 9 pages. (Year: 2016).*

(Continued)

*Primary Examiner* — Kris E Mackes
*Assistant Examiner* — Tiffany Thuy Bui
(74) *Attorney, Agent, or Firm* — Fish & Richardson P.C.

(57) ABSTRACT

Implementations of the present disclosure include receiving a merger request including a first identifier of a first node, a second identifier of a second node, and an identifier of a first smart asset, the first smart asset being associated with the first node, determining whether the first smart asset is capable of merger with a second smart asset associated with the second node at least partially based on the identifier of the first smart asset and an identifier of the second smart asset, and, in response to determining that the first smart asset is capable of being merged with the second smart asset, automatically: updating the second smart asset, the updated second smart asset being assigned a value, and including properties of the first smart asset, recording the updated second smart asset to the second node, and deleting the first smart asset.

14 Claims, 5 Drawing Sheets

(51) Int. Cl.
*H04L 9/32* (2006.01)
*G06Q 20/22* (2012.01)
*G06F 16/27* (2019.01)
*G06F 7/14* (2006.01)
*G06Q 30/06* (2012.01)

(52) U.S. Cl.
CPC ......... *G06Q 20/223* (2013.01); *H04L 9/3239* (2013.01); *G06Q 30/06* (2013.01); *G06Q 2220/00* (2013.01); *H04L 2209/38* (2013.01); *H04L 2209/56* (2013.01)

(58) Field of Classification Search
CPC .............. G06Q 2220/00; H04L 9/3239; H04L 2209/38; H04L 2209/56
See application file for complete search history.

(56) References Cited

U.S. PATENT DOCUMENTS

| | | | | |
|---|---|---|---|---|
| 10,102,265 | B1* | 10/2018 | Madisetti | H04L 9/3247 |
| 10,298,585 | B1* | 5/2019 | Treat | G06Q 20/02 |
| 2017/0083907 | A1* | 3/2017 | McDonough | G06Q 20/14 |
| 2017/0237554 | A1* | 8/2017 | Jacobs | H04L 9/0819 713/171 |
| 2017/0364552 | A1* | 12/2017 | Pattanaik | H04L 9/3297 |
| 2017/0366516 | A1 | 12/2017 | Pattanaik et al. | |
| 2018/0089645 | A1 | 3/2018 | McDonald et al. | |
| 2018/0139043 | A1* | 5/2018 | Jayachandran | G06Q 20/065 |
| 2018/0139186 | A1* | 5/2018 | Castagna | H04L 9/3242 |
| 2018/0232803 | A1* | 8/2018 | Taylor | G06Q 40/02 |
| 2018/0268152 | A1 | 9/2018 | Cuomo et al. | |
| 2018/0285837 | A1 | 10/2018 | Wu | |
| 2018/0293576 | A1 | 10/2018 | Song et al. | |
| 2018/0300382 | A1 | 10/2018 | Madisetti et al. | |
| 2018/0330342 | A1 | 11/2018 | Prakash et al. | |
| 2018/0343126 | A1* | 11/2018 | Fallah | H04L 9/30 |
| 2018/0356989 | A1* | 12/2018 | Meister | G06F 11/2089 |
| 2019/0013948 | A1* | 1/2019 | Mercuri | G06Q 20/02 |
| 2019/0114706 | A1* | 4/2019 | Bell | G06Q 40/025 |
| 2019/0130484 | A1* | 5/2019 | de Jong | G06Q 20/02 |
| 2019/0251079 | A1 | 8/2019 | Yan | |
| 2020/0034457 | A1* | 1/2020 | Brody | G06F 16/137 |

FOREIGN PATENT DOCUMENTS

| | | |
|---|---|---|
| CN | 107392608 | 11/2017 |
| CN | 108335206 | 7/2018 |
| CN | 108416675 | 8/2018 |
| CN | 108694500 | 10/2018 |
| CN | 108830686 | 11/2018 |
| JP | 2008015806 | 1/2008 |
| JP | 2018036893 | 3/2018 |
| JP | 6391128 | 8/2018 |
| JP | 2018132794 | 8/2018 |
| KR | 20180079847 | 7/2018 |
| KR | 20180113143 | 10/2018 |
| TW | 201732706 | 9/2017 |
| TW | 201828202 | 8/2018 |

OTHER PUBLICATIONS

Crosby et al., "BlockChain Technology: Beyond Bitcon," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

[No Author Listed], "Blockchain and distributed ledger technologies—Reference architectureWD stage; WD23257," International Telecommunication Union Study Group 17 Series WD 23257, 55 pages.

Chen et al., "Blockchain-based Payment Collection Supervision System using Pervasive Bitcoin Digital Waller," IEEE 13th International Conference on Wireless and Mobile Computing, Networking and Communications, Oct. 2017, pp. 139-146.

Extended European Search Report in European Application No. 18865367.9, dated Oct. 24, 2019, 9 pages.

PCT International Search Report and Written Opinion in International Application No. PCT/CN2018/118514, dated Jul. 29, 2019, 6 pages.

Xu et al., "Design of Network Media's Digital Rights Management Scheme Based on Blockchain Technology," IEEE 13th International Symposium on Autonomous Decentralized System (ISADS), Mar. 2017, pp. 128-133.

U.S. Appl. No. 16/390,925, filed Apr. 22, 2019, Shao.

* cited by examiner

US 11,030,188 B2

PLATFORM FOR ATOMIC TRANSFER OF SMART ASSETS WITHIN BLOCKCHAIN NETWORKS

CROSS-REFERENCE TO RELATED APPLICATIONS

This application is a continuation of PCT Application No. PCT/CN2018/118514, filed on Nov. 30, 2018, which is hereby incorporated by reference in its entirety.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case (e.g., crypto-currencies). Example types of blockchain networks can include public blockchain networks, private blockchain networks, and consortium blockchain networks. A public blockchain network is open for all entities to use the DLS, and participate in the consensus process. A private blockchain network is provided for a particular entity, which centrally controls read and write permissions. A consortium blockchain network is provided for a select group of entities, which control the consensus process, and includes an access control layer.

Blockchain networks can be used for trading of value through the transfer and exchange of digital assets. Many digital assets exchanged within blockchain networks are represented by a numerical value. These types of digital assets are easily divided, easily merged together, and, as a result, are easily transferable from one node of a blockchain network to another node.

SUMMARY

Implementations of the present disclosure include computer-implemented methods for transferring digital assets within a blockchain network. More particularly, implementations of the present disclosure are directed to a platform for atomic transfers of smart assets within a blockchain network through atomic division, and/or atomic merger of smart assets.

In some implementations, actions include receiving a merger request including a first identifier of a first node, a second identifier of a second node, and an identifier of a first smart asset, the first smart asset being associated with the first node, determining whether the first smart asset is capable of merger with a second smart asset associated with the second node at least partially based on the identifier of the first smart asset and an identifier of the second smart asset, and, in response to determining that the first smart asset is capable of being merged with the second smart asset, automatically: updating the second smart asset, the updated second smart asset being assigned a value, and including properties of the first smart asset, recording the updated second smart asset to the second node, and deleting the first smart asset. Other implementations include corresponding systems, apparatus, and computer programs, configured to perform the actions of the methods, encoded on computer storage devices.

These and other implementations may each optionally include one or more of the following features: determining whether the first smart asset is capable of merger is determined by executing a function provided in computer-executable smart contract associated with the first smart asset; determining whether the first smart asset is capable of merger is determined at least partially based on a type identifier associated with the first smart asset and a type identifier associated with the second smart asset; the value is provided as one of a numerical value, and a string description; the string description is provided in Javascript object notation (JSON); the value is a sum of an original value of the first smart asset plus an original value of the second smart asset; actions further include: in response to determining the first smart asset is not capable of being merged with the second smart asset, automatically: recording the first smart asset to the second node, the first smart asset being assigned a second identifier and a second value, and deleting the first smart asset from the first node; the second value is equal to an original value of the first smart asset; the blockchain network is a consortium blockchain network; and the first smart asset and the second smart asset are each defined by an underlying data object having multiple fields.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
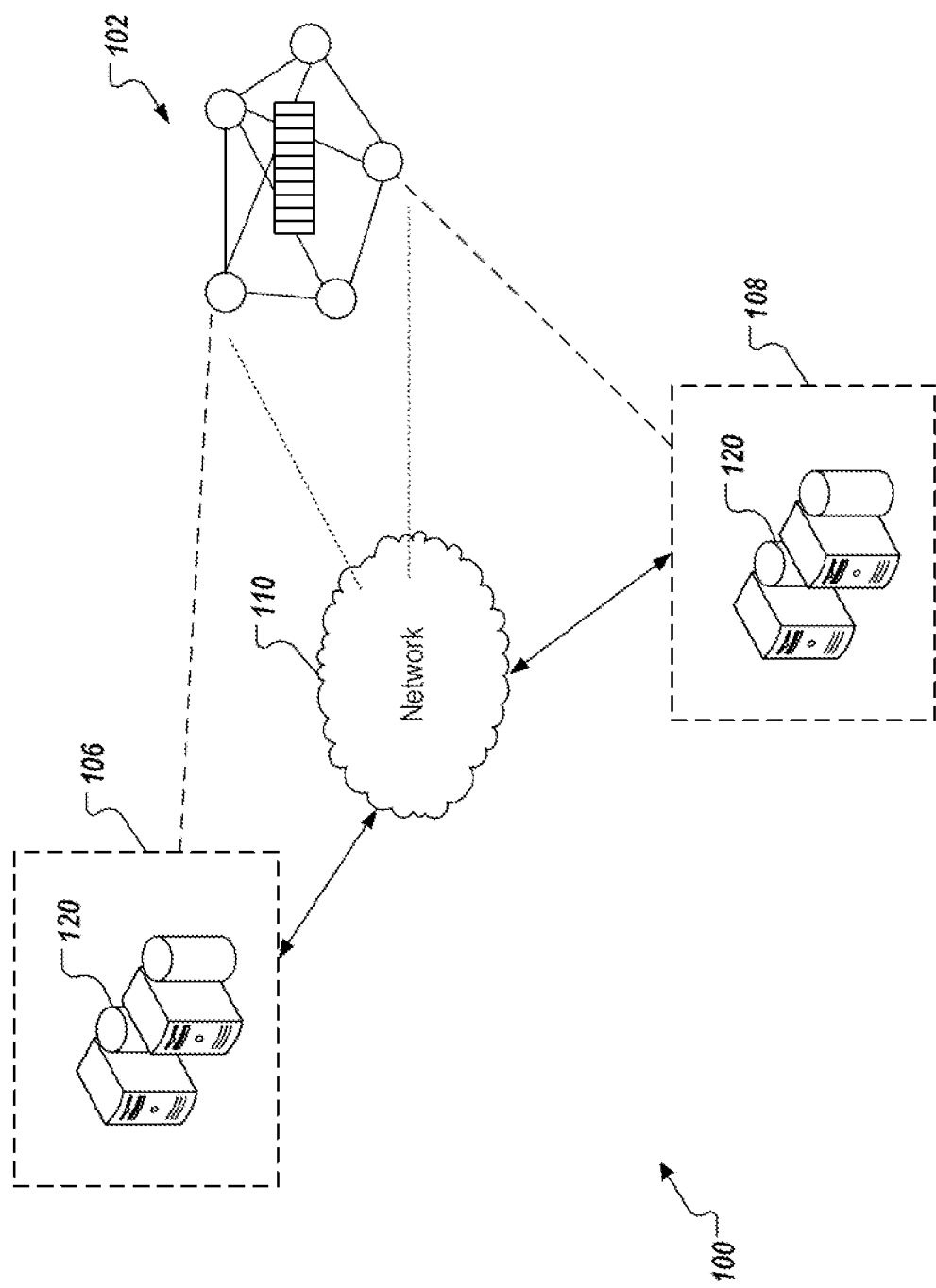
FIG. 1 depicts an example environment that can be used to execute implementations of the present disclosure.

Implementations of the present disclosure include computer-implemented methods for transferring digital assets within a blockchain network. More particularly, implementations of the present disclosure are directed to a platform for atomic transfers of digital assets within a blockchain network through the atomic division, and/or atomic merger of smart assets. In some implementations, actions include receiving a merger request including a first identifier of a first node, a second identifier of a second node, and an identifier of a first smart asset, the first smart asset being associated with the first node, determining whether the first smart asset is capable of merger with a second smart asset associated with the second node at least partially based on the identifier of the first smart asset and an identifier of the second smart asset, and, in response to determining that the first smart asset is capable of being merged with the second smart asset, automatically: updating the second smart asset, the updated second smart asset being assigned a value, and including properties of the first smart asset, recording the updated second smart asset to the second node, and deleting the first smart asset.

To provide further context for implementations of the present disclosure, and as introduced above, distributed ledger systems (DLSs), which can also be referred to as consensus networks (e.g., made up of peer-to-peer nodes), and blockchain networks, enable participating entities to securely, and immutably conduct transactions, and store data. Although the term blockchain is generally associated with the Bitcoin crypto-currency network, blockchain is used herein to generally refer to a DLS without reference to any particular use case. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. An example public blockchain network includes the Bitcoin network, which is a peer-to-peer payment network. The Bitcoin network leverages a distributed ledger, referred to as blockchain. As noted above, the term blockchain, however, is used to generally refer to distributed ledgers without particular reference to the Bitcoin network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. An example consensus protocol includes, without limitation, proof-of-work (POW) implemented in the Bitcoin network.

In general, a private blockchain network is provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present disclosure are described in further detail herein with reference to a consortium blockchain network, which is public among the participating entities (e.g., members of a consortium). It is contemplated, however, that implementations of the present disclosure can be realized in any appropriate type of blockchain network. Although techniques described in the present disclosure are indicated as being relevant to consortium blockchain networks, the techniques can also be used, with or without changes, in other types of blockchain networks, including public blockchain networks and private blockchain networks.

Blockchain networks can be used conduct transactions involving the transfer and exchange of digital assets. Digital assets exchanged within a blockchain network represent value. For example, crypto-currencies, such as Bitcoin, represents value that can be used to purchase products, and/or services. Crypto-currencies are provided as an alternative to real-word, physical currencies (e.g., Chinese yuan, US dollar). In many instances, digital assets are relatively simplistic, and include, for example, a unique identifier of the digital asset, and a numerical value. By representing the value of the digital asset as a numerical value, transfers of part or all of the digital asset are relatively simplistic, as the value of the asset can be infinitely divisible. Additionally, merger of two digitals assets that both contain numerical values is easily accomplished by adding the value of the digital assets together to determine a final merged value.

While basic numerical-value digital assets allow for simple value transfers, as blockchain networks become increasingly relied upon for conducting transactions, there exists a growing need for more complex digital assets that can accurately represent complex real-world assets. In order to satisfy this need, more complex digital assets, which can be referred to as smart assets have been introduced. In some examples, smart assets are provided as digital representations of real-world assets. As described herein, smart assets can be transferred between entities. In some examples, a smart asset corresponds to any appropriate type of real-world asset that can held, or owned by an entity (e.g., person, enterprise). Example real-world assets can include, without limitation, monetary funds, oil, fuel, food, and the like. In general, a smart asset can be representative of any real-world asset that has multiple properties including quantity, or units, for example.

Smart assets can be created, stored, and exchanged within a distributed database (e.g., a consortium blockchain). In some examples, a smart asset is provided as a data object that includes multiple fields. In some examples, fields can be provided to record a unique identifier assigned to the smart asset, and a type identifier assigned to the asset. In some examples, fields can be provided to record properties of the smart asset (e.g., quantity, units). A smart asset may be created within a distributed database by adding the unique identifier for the smart asset into a respective field of a smart asset object in the distributed database. In some examples, the unique identifier includes address information assigned to the smart asset. Smart assets are identified within the distributed database by the address information contained within the field of the corresponding smart asset object that represents the smart asset.

By representing real-world assets as smart assets, entities can digitally transfer and exchange real-world assets by exchanging corresponding smart assets in a blockchain network. For example, a member of a consortium blockchain network, having appropriate authority/permissions, can create a smart asset corresponding to a real-world asset. After creation of the smart asset, the member can conduct transactions involving the smart asset with other members of the consortium blockchain network. Consensus processing of any transactions involving the smart asset is performed based on a consensus algorithm of the consortium blockchain network, and completed transactions are included in the distributed database (e.g., the consortium blockchain).

Smart assets are described in further detail in commonly assigned CN Application No. 201810151607.8, filed on Feb. 14, 2018, the disclosure of which is expressly incorporated herein by reference in the entirety.

Current methods of transferring digital assets with multiple fields (e.g., smart assets) require several atomic steps to be performed in order to complete a single transfer. For example, transferring a portion of a smart asset under current transfer methods requires making a query to determine the transferability of the asset, segmenting the asset, and transferring the segmented asset from a first node in the blockchain network to a second node in the blockchain network. Additionally, in order to complete a transfer of an asset to a node, several queries must be made to determine whether the asset can be merged with any assets already associated with the node. Each of the atomic steps required for transferring an asset must be processed sequentially. As a result, current transfer methods cannot guarantee of atomicity, and failure to atomize the transfer operation can result in fragmentation of the transferred asset.

In view of the above context, and as described in further detail herein, implementations of the present disclosure provide a platform for atomic transfers of digital assets within a blockchain network through the atomic division, and/or atomic merger of smart assets.

FIG. 1 depicts an example environment 100 that can be used to execute implementations of the present disclosure. In some examples, the example environment 100 enables entities to participate in a consortium blockchain network 102. The example environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
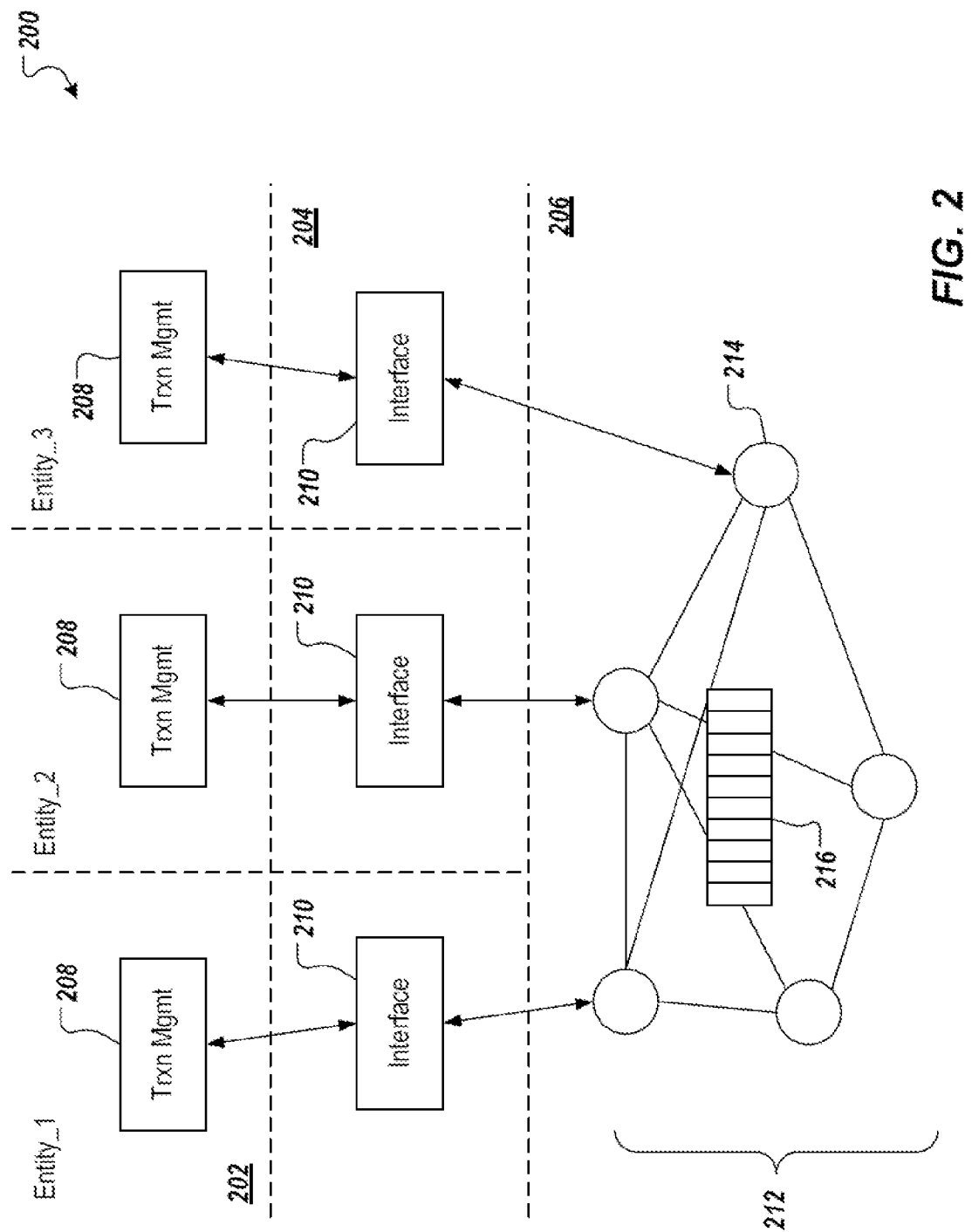
FIG. 2 depicts an example conceptual architecture in accordance with implementations of the present disclosure.

FIG. 2 depicts an example conceptual architecture 200 in accordance with implementations of the present disclosure. The example conceptual architecture 200 includes an entity layer 202, a hosted services layer 204, and a blockchain network layer 206. In the depicted example, the entity layer 202 includes three entities, Entity_1 (E1), Entity_2 (E2), and Entity_3 (E3), each entity having a respective transaction management system 208.

In the depicted example, the hosted services layer 204 includes interfaces 210 for each transaction management system 210. In some examples, a respective transaction management system 208 communicates with a respective interface 210 over a network (e.g., the network 110 of FIG. 1) using a protocol (e.g., hypertext transfer protocol secure (HTTPS)). In some examples, each interface 210 provides communication connection between a respective transaction management system 208, and the blockchain network layer 206. More particularly, the interface 210 communicate with a blockchain network 212 of the blockchain network layer 206. In some examples, communication between an interface 210, and the blockchain network layer 206 is conducted using remote procedure calls (RPCs). In some examples, the interfaces 210 "host" blockchain network nodes for the respective transaction management systems 208. For example, the interfaces 210 provide the application programming interface (API) for access to blockchain network 212.

As described herein, the blockchain network 212 is provided as a peer-to-peer network including a plurality of nodes 214 that immutably record information in a blockchain 216. Although a single blockchain 216 is schematically depicted, multiple copies of the blockchain 216 are provided, and are maintained across the blockchain network 212. For example, each node 214 stores a copy of the blockchain. In some implementations, the blockchain 216 stores information associated with transactions that are performed between two or more entities participating in the consortium blockchain network.

Figure 3:
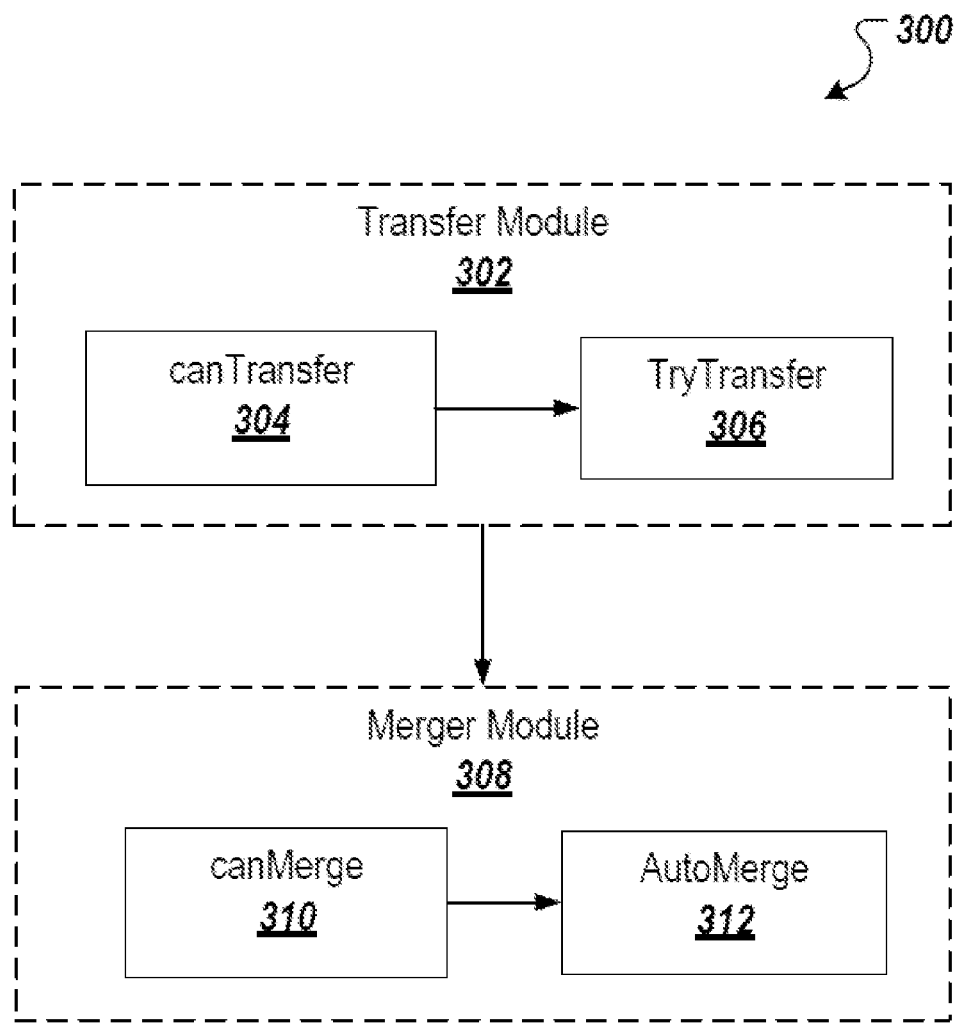
FIG. 3 depicts an example asset transfer platform in accordance with implementations of the present disclosure.

FIG. 3 depicts an example asset transfer platform 300 in accordance with implementations of the present disclosure. In the depicted example, the example asset transfer platform 300 includes a transfer module 302, and a merger module 308. As described in further detail herein, all or a portion of a smart asset can be atomically transferred from a first node (e.g. node 214 of FIG. 2) of a blockchain network (e.g., consortium blockchain network 102 of FIG. 1) to a second node of the blockchain network using the transfer module 302. As also described in further detail herein, a smart asset can be atomically merged with another smart asset recorded on a node of a blockchain network using the merger module 308.

In accordance with implementations of the present disclosure, the transfer module 302 receives a transfer request from a member of a blockchain network. In some examples, the transfer request is submitted to the transfer module 302 by a member of a consortium blockchain network. In some implementations, the transfer request includes a first identifier of a first node in the blockchain network (e.g., sending node), a second identifier of a second node in the blockchain network (e.g., receiving node), an identifier of a smart asset, and a value. In some implementations, the transfer module 302 executes a single atomic operation for transferring the value specified in the transfer request from the identified asset to the second node from the first node.

In some implementations, the smart asset identified in the transfer request is provided as a data object that includes multiple fields. In some examples, fields of a smart asset can be provided to record properties of the asset (e.g., type, quantity, value). In some examples, fields of a smart asset object can be provided to record the identifier assigned to the asset, and a type identifier assigned to the asset. In some implementations, the identifier of the smart asset includes address information assigned to the smart asset (e.g., an address specifying a location of the smart asset within the blockchain network).

The value provided in the transfer request represents a quantity (an amount) of the smart asset that is to be transferred from the first node to the second node. In some examples, the value is provided as a numerical value. For example, the value can be provided as a numerical quantity of a real-world asset (e.g., gallons of fuel). In some examples, the value is provided as a string description. For example, the value can be provided as "twenty barrels of oil" or "one thousand acres of land." In some examples, the value is provided as a Javascript object notation (JSON) string description.

In the example FIG. 3, the transfer module 302 includes a canTransfer function 304, and a TryTransfer function 306. In some examples, the transfer request received by the transfer module 302 is processed by executing the canTransfer function 304, and the TryTransfer 306 function using the information included in the transfer request. In some examples, the canTransfer function 304, and the TryTransfer function 306 are provided within a computer-executable smart contract associated with the smart asset identified in the transfer request. At a high-level, a smart contract can be described as a contract implemented and deployed in the consortium blockchain network, and includes functions, and/or data related to smart assets (e.g., computer-executable functions).

In some implementations, the canTransfer function 304 determines whether the value of the smart asset is less than the value specified in the transfer request. In some implementations, the canTransfer function 304 determines the value of the smart asset by retrieving the value stored in the value field of the smart asset located at the address provided by the identifier of the smart asset.

In some implementations, the canTransfer function 304 determines the type identifier of the smart asset. In some implementations, the canTransfer function 304 determines the type identifier of the asset by retrieving the type identifier stored in the type field of the smart asset located at the address provided by the identifier of the smart asset. In some examples, the canTransfer function 304 determines whether the smart asset is transferable at least partially based on determining the type identifier of the smart asset. For example, the canTransfer function 304 can determine that a smart asset with the type identifier "chairs" cannot be transferred except in whole number units, as the real-world asset represented by the smart asset (chairs) cannot be physically divided for transfer except into whole number units (e.g., cannot transfer 1.5 chairs). As another example, the canTransfer function 304 can determine that a smart asset with the type identifier "fuel" can be transferred in the requested units, as the real-world asset represented by the smart asset (fuel) can be physically divided for transfer in fractional units (e.g., can transfer 1.5 gallons of fuel).

In some implementations, if the value of the smart asset is less than the value provided in the transfer request, or the type identifier of the smart asset indicates that the smart asset is not capable of being split by the value, the canTransfer function 304 returns "FALSE," and the transaction is terminated. In some implementations, if the value of the smart asset is greater than or equal to the value provided in the transfer request, and the type identifier of the smart asset indicates that the smart asset is capable of being split by the value, the canTransfer function 304 returns "TRUE."

In some implementations, the TryTransfer function 306 is executed automatically in response to the canTransfer function 304 returning "TRUE" for the transfer request. In some implementations, the TryTransfer function 306 generates a first smart asset and a second smart asset. In some examples, each of the smart assets generated by the TryTransfer function 306 are provided as data objects that include multiple fields, the same fields as the smart asset. In some examples, the smart assets generated by the TryTransfer function 306 include the same properties as the smart asset identified in the transfer request. For example, the first and second smart assets generated by the TryTransfer function 306 can include the same type identifier as the smart asset identified in the transfer request.

In some implementations, the TryTransfer function 306 assigns a first identifier and a first value to the first smart asset. In some examples, the first value is a remainder of an original value of the smart asset identified in the transfer request minus the value specified in the transfer request. In some implementations, the TryTransfer function 306 assigns a second identifier and the value specified in the transfer request to the second smart asset. In some examples, the first identifier and the second identifier are each unique identifiers. In some examples, the first identifier and the second identifier include address information assigned to the first smart asset and the second smart asset, respectively. In some examples, the first identifier and the first value are stored as fields within a data object underlying the first smart asset. In some examples, the second identifier and the value are stored as fields within a data object underlying the second smart asset. In some examples, the first smart asset, and the second smart asset can be considered sub-assets of the smart asset.

In some implementations, the first smart asset generated by the TryTransfer function 306 is automatically recorded to the first node of the consortium blockchain network. In some implementations, the second smart asset generated by the TryTransfer function 306 is automatically recorded to the second node of the consortium consortiumnetwork. In some implementations, the TryTransfer function 306 automatically deletes the smart asset identified in the transfer request (e.g., the smart asset, from which the first and second smart assets were generated), upon successful recordation of the first smart asset and the second smart asset within the consortium blockchain network.

Non-limiting, example inputs can be provided as (e.g., (userAAddress, userBAddress, assetAddress, amount):

TryTransfer("23d61f4a88", "90be1290c0eeab3", "4992e1a2e8f6d", 100);

TryTransfer("23d61f4a88", "90be1290c0eeab3", "4992e1a2e8f6d", {"amount": 100, "type" "RMB"});

Example pseudo-code for the execution of transfer logic can be provided as:

```
if (canTransfer(asset, amount)) {
    [splitAssetA, splitAssetB] = Split(asset, amount) ;
    Transfer(userA, userB, splitAssetA) ;
    return true;
} else }
    return false;
}
```

Example pseudo-code for the canTransfer function 304 can be provided as:

```
def canTransfer(self, asset, amount) :
    if asset.value >= amount and asset.isTransferable:
        return True
    else
        return False
```

As explained in further detail herein, the merger module 308 executes a single atomic operation for merging a first smart asset identified in the merger request with a second smart asset associated with a node of a blockchain network. In accordance with implementations of the present disclosure, the merger module 308 receives a merger request. In some implementations, the merger module 308 automatically receives a merger request upon successful execution of the TryTransfer function 306 of the transfer module 302. In some implementations, the merger module 308 automatically receives a merger request when a smart asset is being recorded to a node (e.g., node(s) 214 of FIG. 2) of a consortium blockchain network (e.g., consortium blockchain network 102 of FIG. 1).

In some implementations, the merger request received by the merger module 308 includes a first identifier of a first node, a second identifier of a second node, and an identifier of a first smart asset. In some examples, the first smart asset includes an underlying data object that includes multiple fields. In some examples, fields of the first smart asset can be provided to record a unique identifier assigned to the first smart asset, and a type identifier assigned to the first smart asset. In some examples, fields of the smart asset can be provided to record properties of the first smart asset (e.g., quantity, value). In some implementations, the identifier of the first smart asset includes address information assigned to the first smart asset. In some implementations, the first smart asset is associated with the first node.

In the example FIG. 3, the merger module 308 includes a canMerge function 310, and an AutoMerge function 312. In some examples, the merger request received by the merger module 308 is processed by executing the canMerge function 310, and the AutoMerge function 312 using the information included in the merger request. In some examples, the canMerge function 310, and the AutoMerge function 312 are provided by a computer-executable smart contract associated with the first smart asset identified in the merger request.

In some implementations, the canMerge function 310 determines whether the first smart asset provided in the merger request can be merged with a second smart asset associated with a second node identified in the merger request. In some examples, the canMerge function 310 determines whether the first smart asset can be merged with a second smart asset associated with the second node by determining whether a second smart asset associated with the second node contains the same type identifier as the type identifier of the first smart asset. In some examples, the canMerge function 310 determines the type identifiers of the first smart asset and the second smart asset based on the identifier of the first smart asset and the identifier of the second smart asset, respectively. In some implementations, the canMerge function 310 determines that the first smart asset is capable of being merged with a second smart asset when the second smart asset has the same type identifier as the first smart asset.

In some implementations, the canMerge function 310 returns "FALSE" in response to determining that the first smart asset is not capable of being merged with a second smart asset associated with the second node. In some examples, if the canMerge function 310 returns "FALSE" for a merger request, the first smart asset identified in the merger request is automatically recorded on the second node and deleted from the first node. In some implementations, upon the canMerge function 310 returning "FALSE," the first smart asset is assigned a second identifier and a second value. In some examples, the second value is equal to an original value of the first smart asset. In some examples, the second identifier is a unique identifier. In some examples, the second identifier includes address information assigned to the first smart asset recorded on the second node. In some examples, the second identifier and the second value are stored as fields within a data object underlying the first smart asset.

In some implementations, the canMerge function 310 returns "TRUE" in response to determining that the first smart asset is capable of being merged with a second smart asset associated with the second node. In some implementations, the merger request is automatically processed by the AutoMerge function 312 upon the canMerge function 310 returning "TRUE."

In accordance with implementations of the present disclosure, the AutoMerge function 312 automatically updates the second smart asset, records the updated second smart asset to the second node, and deletes the first smart asset from the first node. In some implementations, the AutoMerge function 312 updates the second smart asset to include the properties of the first smart asset and a value.

In some examples, the value assigned to the updated second smart asset by the AutoMerge function 312 is provided as a numerical value. In some examples, the value is provided as a string description. In some examples, the value is provided as a Javascript object notation (JSON) string description. In some examples, the value assigned to the updated second smart asset by the AutoMerge function 312 is equal to a sum of an original value of the first smart asset and an original value of the second smart asset. In some examples, the AutoMerge function 312 determines an original value of the first smart asset and an original value of the second smart asset based on the values stored within the value fields of the data objects underlying the first smart asset and second smart asset, respectively.

Example pseudo-code for the execution of transfer logic can be provided as:

```
Transfer(userA, userB, assetTransfered) ;
for (Asset asset:userB.getAllAssetsByAssetContract (asset.
getAssetContractAddress( )) {
    if (canMerge(asset, assetTransfered)) {
        Merge(userB, asset, assetTransfered) ;
        break;
    }
}
```

Example pseudo-code for the canMerge function 310 can be provided as:

```
def canMerge(self, assetA, assetB) :
    if assetA.startDate == assetB.startDate and
    assetA.endDate == assetB.endDate:
        return True;
    else
        return False;
```

Another example pseudo-code for the canMerge function 310 can be provided as:

```
def canMerge(self, assetA, assetB) :
    if assetA.startDate == assetB.startDate and
    assetA.endDate == assetB.endDate and
    assetA.propertyX == assetB.propertyX:
        return True;
    else
        return False;
```

Still another example pseudo-code for the canMerge function 310 can be provided as:

```
def canMerge(self, assetA, assetB) :
    if assetA.propertyX == assetB.propertyX:
        return True;
    else
        return False;
```

Figure 4:
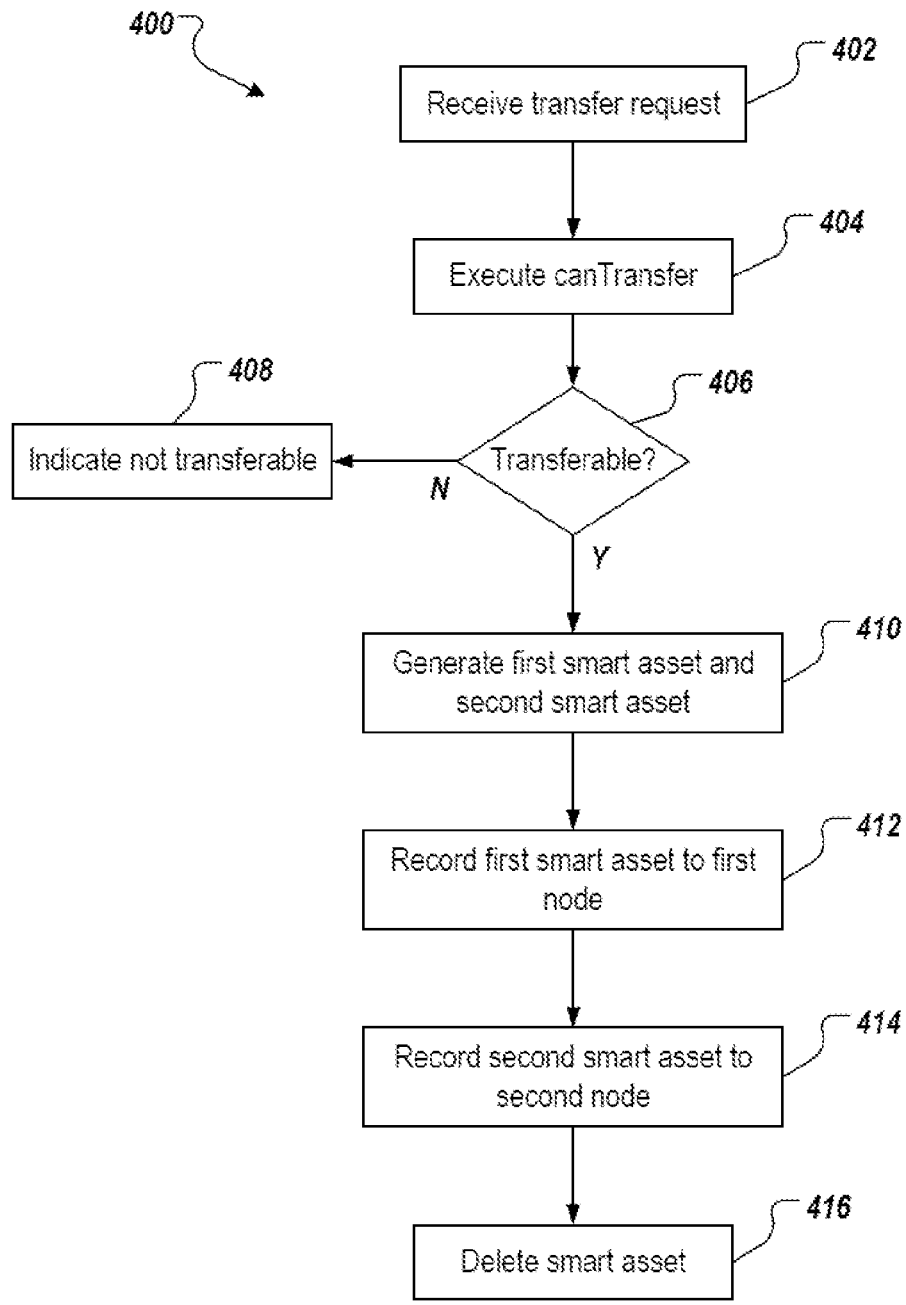
FIGS. 4 and 5 depict example processes that can be executed in accordance with implementations of the present disclosure.

FIG. 4 depicts an example process 400 that can be executed in accordance with implementations of the present disclosure. In some implementations, the example process 400 may be performed using one or more computer-executable programs executed using one or more computing devices. For example, the example process 400 can be executed within a blockchain network.

A transfer request is received (402). For example, a request to transfer a smart asset between nodes within a consortium blockchain network can be received from a member of the consortium blockchain network. In some examples, the request includes a first identifier of a first node in the blockchain network (e.g., sending node), a second identifier of a second node in the blockchain network (e.g., receiving node), an identifier of a smart asset, and a value. In some implementations, the smart asset is provided as a data object that includes multiple fields. In some examples, the value is a numerical value. In some examples, the value is a string description. For example, the value can be provided as a Javascript object notation (JSON).

A canTransfer function is executed (404). The canTransfer function processes the information in the transfer request to determine whether the smart asset is capable of being transferred. In some examples, the canTransfer function determines whether the smart asset is capable of being transferred at least partially based on the identifier of the smart asset. In some examples, the canTransfer function determines whether the smart asset is capable of being transferred at least partially based on a type identifier of the smart asset. In some examples, the canTransfer function determines whether the asset is capable of being transferred at least partially based on determining whether a value of the smart asset is less than the value provided in the transfer request. In some examples, the canTransfer function is provided by a computer-executable smart contract associated with the smart asset.

The capability of the smart asset to be transferred is determined (406). If the smart asset is determined to be incapable of transfer, an indication that the asset is not transferable is provided (408). In some examples, the canTransfer function returns "FALSE" if the smart asset is determined to be incapable of transfer. In some examples, the transaction is terminated if the smart asset is determined to be incapable of transfer.

If the smart asset is determined to be capable of transfer, a first smart asset and a second smart asset are generated (410). In some examples, the first smart asset and the second smart asset are each provided as a data object that includes multiple fields. In some examples, the first smart asset and the second smart asset include the same properties as the smart asset identified in the transfer request. For example, the first smart asset and the second smart asset can each include the same type identifier as the smart asset identified in the transfer request.

In some implementations, the first smart asset is assigned a first identifier and a first value. In some examples, the first value is the remainder of an original value of the smart asset identified in the transfer request minus the value identified in the transfer request. In some implementations, the second smart asset is assigned a second identifier and the value identified in the transfer request. In some examples, the first identifier and the second identifier include address information for the first smart asset and the second smart asset, respectively.

The first smart asset is recorded to the first node of the blockchain network (412). The second smart asset is recorded to the second node of the blockchain network (414).

The smart asset identified in the transfer request (e.g., the smart asset, from which the first and second smart assets were generated), is deleted (416). In some examples, the smart asset is automatically deleted upon successful recordation of the first smart asset and the second smart asset within the consortium blockchain network.

Figure 5:
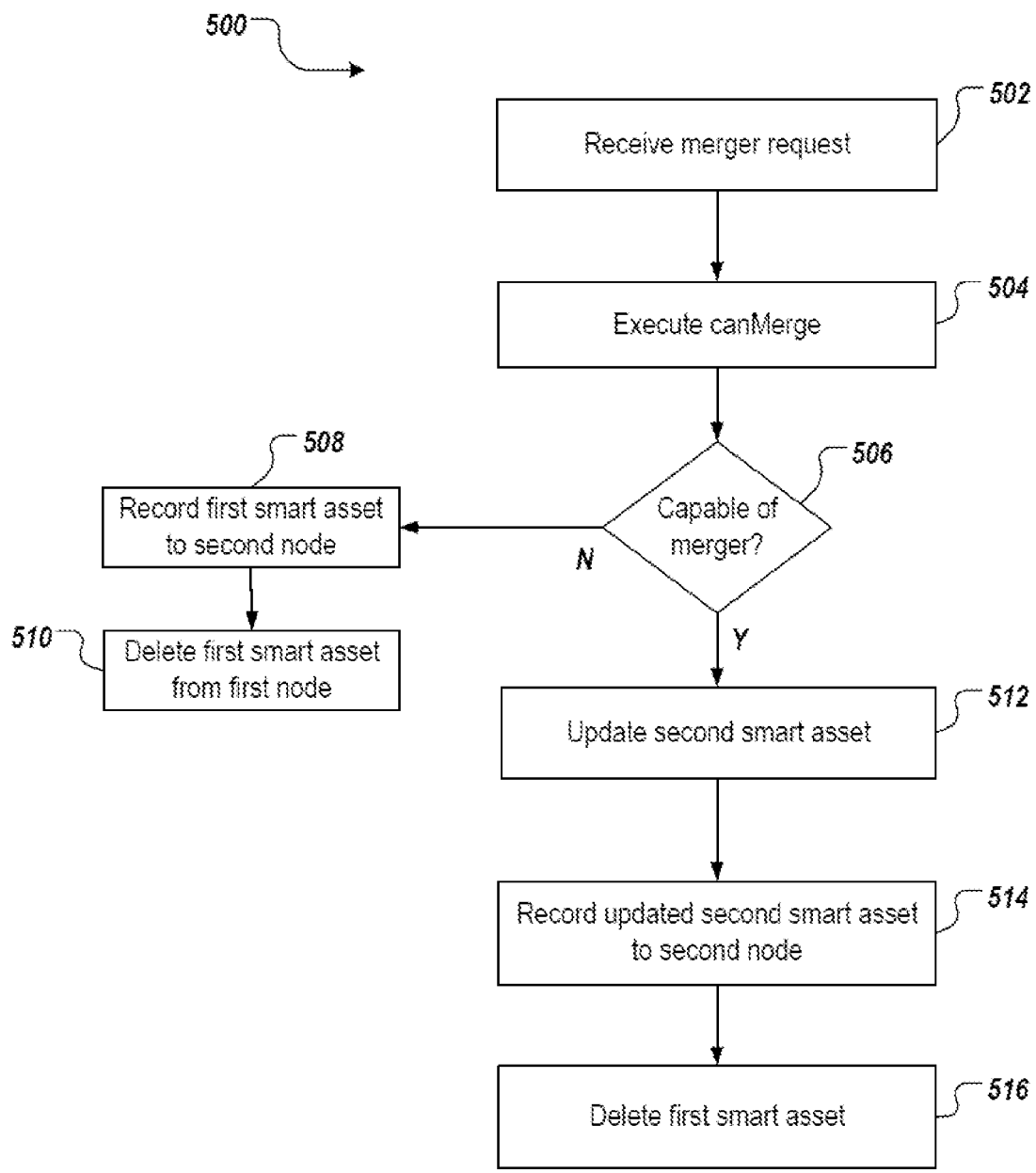

FIG. 5 depicts an example process 500 that can be executed in accordance with implementations of the present disclosure. In some implementations, the example process 500 may be performed using one or more computer-executable programs executed using one or more computing devices. For example, the example process 500 can be executed within a blockchain network.

A merger request is received (502). For example, a merger request can be received when a smart asset is being recorded to a node of a consortium blockchain network. In some examples, the request includes a first identifier of a first node, a second identifier of a second node, and an identifier of a first smart asset. In some examples, the first smart asset is associated with the first node. In some examples, the first smart asset includes an underlying data object that includes multiple fields.

A canMerge function is executed (504). The canMerge function processes information in the merger request to determine whether the first smart asset is capable of merger with a second smart asset associated with the second node identified in the merger request. In some implementations, the canMerge function determines if the first smart asset is capable of merger with the second smart asset at least partially based on the identifier of the first smart asset and an identifier of the second smart asset. In some examples, the canMerge function determines if the first smart asset is capable of merger with the second smart asset at least partially based on a type identifier of the first smart asset and a type identifier of a second smart asset. In some examples, the second smart asset includes an underlying data object that includes multiple fields.

The ability of the first smart asset to be merged with a second smart asset associated with the second node is determined (506). In some examples, the first smart asset is determined to be capable of merger with the second smart asset if a type identifier of the first smart asset matches a type identifier of the second smart asset.

If it is determined that the first smart asset is not capable of merger with a second smart asset associated with the second node, the first smart asset is automatically recorded to the second node (508) and deleted from the first node (510). In some examples, the first smart asset is assigned a second identifier and a second value. In some examples, the second value is equal to an original value of the first smart asset. In some examples, the second value is provided as a numerical value. In some examples, the second value is a string description. For example, the second value can be provided as a Javascript object notation (JSON). In some examples, the second identifier includes address information for the first smart asset.

If it is determined that the first smart asset is capable of merger with a second smart asset associated with the second node, the second smart asset is automatically updated (512). In some examples, the second smart asset is updated to include properties of the first smart asset and a value. In some examples, the value is equal to a sum of an original value of the first smart asset and an original value of the second smart asset. In some examples, the value is provided as a numerical value. In some examples, the value is a string description. For example, the value can be provided as a Javascript object notation (JSON).

In some implementations, the updated second smart asset is automatically recorded on the second node (514). The first smart asset is deleted (516). In some examples, the first smart asset is automatically deleted upon successful recordation of the updated second smart asset to the second node.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors and comprising:

receiving a transfer request that comprises a sending node identifier of a sending node in a blockchain network, a receiving node identifier of a receiving node in the blockchain network, an identifier of an original smart asset, and a transfer value that represents a quantity of the original smart asset that is to be transferred from the sending node to the receiving node;

determining that the original smart asset is transferrable, and then:

generating, from the original smart asset, a remainder smart asset and a transfer smart asset that each include the same properties as the original smart asset;

assigning a first identifier and a first value to the remainder smart asset, wherein the first value is a remainder of an original value of the original smart asset minus the transfer value, and assigning a second identifier and the transfer value to the transfer smart asset;

recording the remainder smart asset to the sending node of the blockchain network and recording the transfer smart asset to the receiving node of the blockchain network; and deleting the original smart asset upon recording the remainder and the transfer smart assets;

receiving a merger request upon a successful completion of the transfer request, the merger request comprising an identifier of the receiving node and an identifier of the transfer smart asset;

determining whether the transfer smart asset is capable of merger with a target smart asset associated with the receiving node at least partially based on the identifier of the transfer smart asset and an identifier of the target smart asset; and in response to determining that the transfer smart asset is capable of being merged with the target smart asset, automatically:

updating the target smart asset to include properties of the transfer smart asset and a new value, recording the updated target smart asset to the receiving node, and deleting the transfer smart asset; and in response to determining that the transfer smart asset is not capable of being merged with the target smart asset, automatically recording the transfer smart asset to the receiving node.

2. The method of claim 1, wherein determining whether the transfer smart asset is capable of merger is determined by executing a function provided in computer-executable smart contract associated with the transfer smart asset.

3. The method of claim 1, wherein determining whether the transfer smart asset is capable of merger is determined at least partially based on a determination that the identifier of the transfer smart asset is the same as the identifier of the target smart asset.

4. The method of claim 1, wherein the new value is a sum of the transfer value plus an original value of the target smart asset.

5. A non-transitory computer-readable storage medium coupled to one or more processors and having instructions stored thereon which, when executed by the one or more processors, cause the one or more processors to perform operations comprising:

receiving a transfer request that comprises a sending node identifier of a sending node in a blockchain network, a receiving node identifier of a receiving node in the blockchain network, an identifier of an original smart asset, and a transfer value that represents a quantity of the original smart asset that is to be transferred from the sending node to the receiving node;

determining that the original smart asset is transferrable, and then:

generating, from the original smart asset, a remainder smart asset and a transfer smart asset that each include the same properties as the original smart asset;

assigning a first identifier and a first value to the remainder smart asset, wherein the first value is a remainder of an original value of the original smart asset minus the transfer value, and assigning a second identifier and the transfer value to the transfer smart asset;

recording the remainder smart asset to the sending node of the blockchain network and recording the transfer smart asset to the receiving node of the blockchain network; and deleting the original smart asset upon recording the remainder and the transfer smart assets;

receiving a merger request upon a successful completion of the transfer request, the merger request comprising an identifier of the receiving node and an identifier of the transfer smart asset;

determining whether the transfer smart asset is capable of merger with a target smart asset associated with the receiving node at least partially based on the identifier of the transfer smart asset and an identifier of the target smart asset; and in response to determining that the transfer smart asset is capable of being merged with the target smart asset, automatically:

updating the target smart asset to include properties of the transfer smart asset and a new value, recording the updated target smart asset to the receiving node, and deleting the transfer smart asset; and in response to determining that the transfer smart asset is not capable of being merged with the target smart asset, automatically recording the transfer smart asset to the receiving node.

6. The non-transitory computer-readable storage medium of claim 5, wherein determining whether the transfer smart asset is capable of merger is determined by executing a function provided in computer-executable smart contract associated with the transfer smart asset.

7. The non-transitory computer-readable storage medium of claim 5, wherein determining whether the transfer smart asset is capable of merger is determined at least partially based on a determination that the identifier of the transfer smart asset is the same as the identifier of the target smart asset.

8. The non-transitory computer-readable storage medium of claim 5, wherein the new value is a sum of the transfer value plus an original value of the target smart asset.

9. A system, comprising:

a computing device; and a computer-readable storage device coupled to the computing device and having instructions stored thereon which, when executed by the computing device, cause the computing device to perform operations comprising:

receiving a transfer request that comprises a sending node identifier of a sending node in a blockchain network, a receiving node identifier of a receiving node in the blockchain network, an identifier of an original smart asset, and a transfer value that represents a quantity of the original smart asset that is to be transferred from the sending node to the receiving node;

determining that the original smart asset is transferrable, and then:

generating, from the original smart asset, a remainder smart asset and a transfer smart asset that each include the same properties as the original smart asset assigning a first identifier and a first value to the remainder smart asset, wherein the first value is a remainder of an original value of the original smart asset minus the transfer value, and assigning a second identifier and the transfer value to the transfer smart asset;

recording the remainder smart asset to the sending node of the blockchain network and recording the transfer smart asset to the receiving node of the blockchain network; and deleting the original smart asset upon recording the remainder and the transfer smart assets;

receiving a merger request upon a successful completion of the transfer request, the merger request comprising an identifier of the receiving node and an identifier of the transfer smart asset;

determining whether the transfer smart asset is capable of merger with a target smart asset associated with the receiving node at least partially based on the identifier of the transfer smart asset and an identifier of the target smart asset; and in response to determining that the transfer smart asset is capable of being merged with the target smart asset, automatically:

updating the target smart asset to include properties of the transfer smart asset and a new value, recording the updated target smart asset to the receiving node, and deleting the transfer smart asset; and in response to determining that the transfer smart asset is not capable of being merged with the target smart asset, automatically recording the transfer smart asset to the receiving node.

10. The system of claim 9, wherein determining whether the transfer smart asset is capable of merger is determined by executing a function provided in computer-executable smart contract associated with the transfer smart asset.

11. The system of claim 9, wherein determining whether the transfer smart asset is capable of merger is determined at least partially based on a determination that the identifier of the transfer smart asset is the same as the identifier of the target smart asset.

12. The system of claim 9, wherein the new value is provided as one of a numerical value, and a string description.

13. The system of claim 12, wherein the string description is provided in Javascript object notation (JSON).

14. The system of claim 9, wherein the new value is a sum of the transfer value plus an original value of the target smart asset.

* * * * *

UNITED STATES PATENT AND TRADEMARK OFFICE
CERTIFICATE OF CORRECTION

PATENT NO. : 11,030,188 B2  
APPLICATION NO. : 16/390119  
DATED : June 8, 2021  
INVENTOR(S) : Xuming Lu, Kailai Shao and Pengtao Qi Page 1 of 1

It is certified that error appears in the above-identified patent and that said Letters Patent is hereby corrected as shown below:

In the Claims

Column 17/Line 14 (Approx.), In Claim 9, delete "asset" and insert -- asset; -- therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*